United States Patent [19]
Tanaka

[11] Patent Number: 5,382,978
[45] Date of Patent: Jan. 17, 1995

[54] METHOD FOR DRIVING TWO-DIMENSIONAL CCD IMAGING DEVICE

[75] Inventor: Takanori Tanaka, Tokyo, Japan

[73] Assignee: NEC Corporation, Tokyo, Japan

[21] Appl. No.: 92,070

[22] Filed: Jul. 16, 1993

[30] Foreign Application Priority Data

Jul. 16, 1992 [JP] Japan .................................. 4-188513

[51] Int. Cl.$^6$ .............................................. H04N 3/14
[52] U.S. Cl. .................................... 348/312; 348/299; 348/313; 348/314
[58] Field of Search ...................... 358/213.11, 213.31, 358/213.29, 213.25, 213.23; 348/297, 298, 299, 312, 313, 314, 317, 319, 320

[56] References Cited

U.S. PATENT DOCUMENTS

| | | | |
|---|---|---|---|
| 4,963,983 | 10/1990 | Kohro et al. | 358/213.13 |
| 4,985,776 | 1/1991 | Taniji | 358/213.31 |
| 4,989,095 | 1/1991 | Whitesel et al. | 358/213.19 |

OTHER PUBLICATIONS

T. Kuriyama et al., "A 1/3-in 270 000 Pixel CCD Image Sensor", Transactions on Electron Devices, vol. 38, No. 5, May 1991, pp. 949–953.

T. Nobusada et al, "Frame Interline Transfer CCD Sensor for HDTV Camera", 1989 IEEE International Solid-State Circuits Conference, pp. 88 and 91.

K. Yonemoto et al., "A 2 Million Pixel FIT-CCD Image Sensor for HDTV Camera System", 1990 IEEE International Solid-State Circuits Conference, pp. 214–215.

*Primary Examiner*—Leo H. Boudreau
*Assistant Examiner*—Phuoc Tran
*Attorney, Agent, or Firm*—Sughrue, Mion, Zinn, Macpeak & Seas

[57] ABSTRACT

A method for driving a CCD solid state imaging device of a frame-interline type is disclosed. The CCD imaging device comprises a semiconductor substrate, an image section including a number of pixels arranged two-dimensionally and each having a radiation sensor, transfer gate and a first vertical CCD, a storage section, a horizontal CCD shift register, and an output section. The semiconductor substrate having a protruding portion as a drain member is biased at a low level for accumulating signal charges during an effective picture interval and at a higher level for draining all of the signal charges during a frame shift transfer period. The amplitude of the driving signals for driving gate electrodes of the vertical CCD shift registers can be large without reading out noise-forming charges so that the transfer efficiency can be improved in a CCD imaging device.

3 Claims, 5 Drawing Sheets

METHOD FOR DRIVING TWO-DIMENSIONAL CCD IMAGING DEVICE

BACKGROUND OF THE INVENTION (a) Field of the Invention

The present invention relates to a method for driving a two-dimensional charge coupled device solid state imaging device (referred to as a CCD imaging device hereinafter) and, more particularly, to an improvement in driving vertical CCD shift registers of a frame-interline CCD imaging device.

(b) Description of the Related Art

Recently, demand for CCD imaging devices is rapidly increasing. Among other imaging devices, frame-interline CCD imaging devices have been developed significantly, since they have advantages of low noise characteristics and a small chip size. However, there is a requirement for a frame-interline CCD imaging devices in which vertical CCD shift registers transfer signal charges in a larger amount and more efficiently.

SUMMARY OF THE INVENTION

Accordingly, an object of the present invention is to provide a method for driving a two-dimensional CCD imaging devices by which signal charges are transferred in a larger amount and with an improved efficiency in vertical CCD shift registers.

The present invention is directed to a method applied to a CCD imaging device which comprises: a substrate; an image section including a plurality of pixels arranged in a vertical and a horizontal directions on the substrate, the pixels each having a radiation sensor responsive to incident light for generating electric charges, a transfer gate having a first gate electrode, a drain member for discharging the electric charges from the radiation sensor, and a first vertical CCD having a second gate electrodes and a vertical channel driven by the first and second gate electrodes for transferring during a charge transfer period the electric charges transferred by the transfer gate, the first vertical CCDs arranged in each column of the vertical direction being coupled together to form a vertical CCD shift register; a storage section including second vertical CCDs each for storing for a while and transferring the electric charges transferred by each of the CCD shift registers; a horizontal CCD shift register for transferring the electric charges transferred by the second vertical CCDs; and an output section responsive to the electric charges transferred by the horizontal CCD shift register for outputting a two-dimensional image signal.

The method of the present invention comprises steps of applying a first bias voltage to the drain members relative to the radiation sensors during a first period other than the charge transfer period, applying a second bias voltage higher than the first bias voltage to the drain members relative to the radiation sensors during the charge transfer period, applying a first driving voltage to the first gate electrodes for reading out the electric charges from the radiation sensors during a charge read-out period, applying a second driving voltage lower than the first driving voltage to the first gate electrodes thereby enabling each of the radiation sensors to accumulate a certain amount of electric charges during the first period except the charge read-out period, and applying transfer driving signals to the first and second gate electrodes for shifting the electric charges within the vertical channels during the charge transfer period, the transfer driving signals each having a peak voltage higher than the second driving voltage.

BRIEF DESCRIPTION OF THE DRAWINGS

The above and other objects, features and advantages of the present invention will be more apparent from the following description, referring to the accompanying drawings in which.

DETAILED DESCRIPTION OF THE PREFERRED EMBODIMENTS

Figure 1:
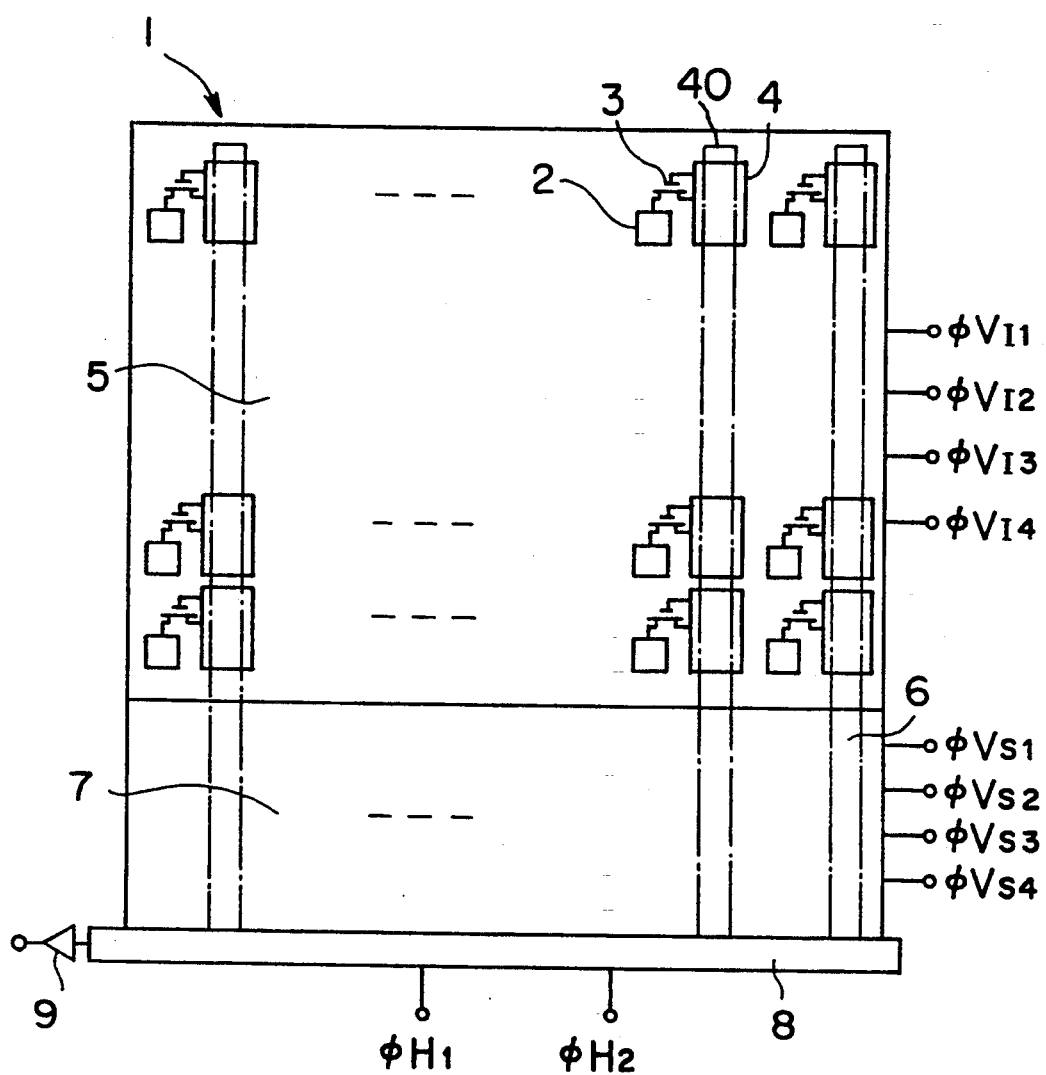
FIG. 1 is a block diagram showing a two-dimensional CCD imaging device to which a method according to an embodiment of the present invention can be applied.

Before describing the present invention, a two-dimensional CCD imaging device to which a method according to the present invention can be applied will be first described. FIG. 1 shows a block diagram of a typical two-dimensional frame-interline transfer (FIT) CCD imaging device. The imaging device 1 comprises an image section 5 in which incident light is converted to signal charges, storage section 7 in which the signal charges generated in the image section 5 are stored for a while, a horizontal CCD shift register 8 coupled to the storage section 7 and driven by two-phase driving signals $\phi H1$ and $\phi H2$ to horizontally transfer the signal charges, and an output section 9 coupled to the horizontal CCD shift register 8 for outputting a two-dimensional image signal.

The image section 5 comprises a number of pixels arranged two-dimensionally, i.e. in a vertical and a horizontal directions. Each of the pixels includes a radiation sensor 2 generating electric charges through photoelectric conversion, transfer gates 3 disposed adjacent to the radiation sensors 2 for reading out the electric charges as signal charges from the radiation sensor 2, and a first vertical CCD 4 for transferring the signal charges read out by the transfer gates 3 from the radiation sensor 2. The first vertical CCDs 4 arranged in each column of the vertical direction are coupled together to form a vertical CCD shift register 40. Each of the first vertical CCDs 4 is driven by four-phase driving signals $\phi V I1$, $\phi V I2$, $\phi V I3$ and $\phi V I4$ to shift the signal charges.

The storage section 7 includes second vertical CCDs or CCD memories 6, each coupled to each of the vertical CCD shift registers 40, for storing for a while the signal charges transferred by the vertical CCD shift registers 40. The CCD memories are driven by four-phase driving signals $\phi VS1$, $\phi VS2$, $\phi VS3$ and $\phi VS4$.

Figure 2:
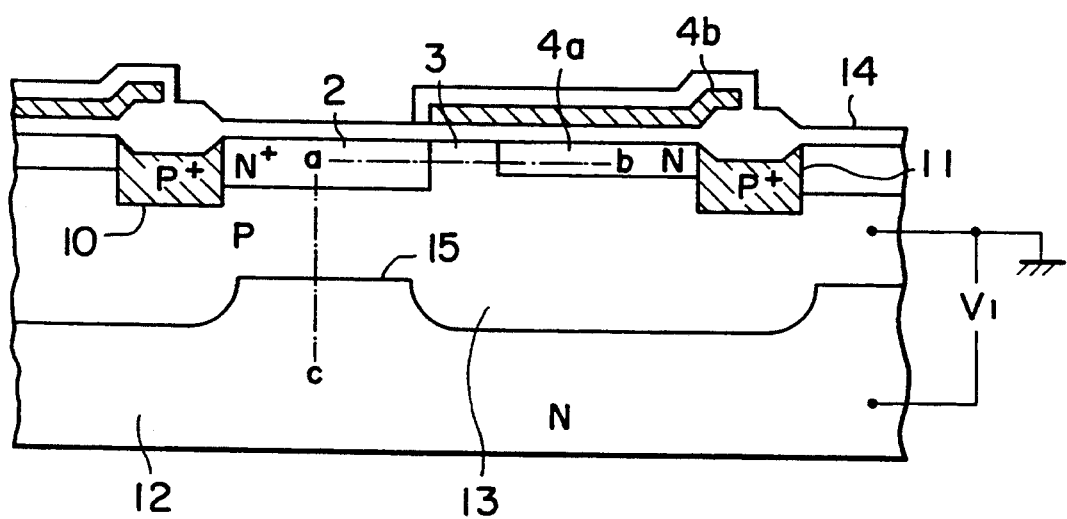
FIG. 2 is partial cross-sectional view of the CCD imaging device of FIG. 1 as viewed in the vertical direction.

FIG. 2 is a cross-sectional view showing a structure of the pixel in the image section 5 of FIG. 1 as viewed in the vertical direction. A P-type diffusion region 13 is formed on an N-type semiconductor substrate 12. The N-type semiconductor substrate 12 has a protruding portion 15 protruding into the P-type diffusion region and serving as a drain member or drain inlet, as described later.

On the P-type diffusion region 13, a heavily doped N-type (N+) diffusion region 2 constituting a photodiode together with the P-type diffusion region 13 is formed at the location above the protruding portion 15. An N-type diffusion region 4a serving as a vertical channel of the first vertical CCD 4 is disposed on the P-type diffusion region 13, with a gap 3 located between the N+ diffusion region 2 and the N-type diffusion region 4a, the gap serving as a transfer gate 3. Adjacent to the N+ diffusion region 2 and N-type diffusion region 4a, there are heavily doped P-type (P+) channel stoppers 10 and 11, respectively, for separating the pixel area from adjacent pixel areas.

A first gate electrode 4b is disposed on an insulating layer 14 covering the pixel area, the gate electrode 4b being located above the N-type diffusion region 4a and the transfer gate 3. Other three gate electrodes or second gate electrodes not shown in the drawing are disposed above the N-type diffusion region 4a of the pixel. The N-type diffusion region 4a and the corresponding four gate electrodes constitute a first vertical CCD 4. A bias voltage V1 is applied to the N-type semiconductor substrate 12 relative to the P-type diffusion region 13.

Now, the method according to the present invention will be described in comparison with the conventional method.

Figure 3:
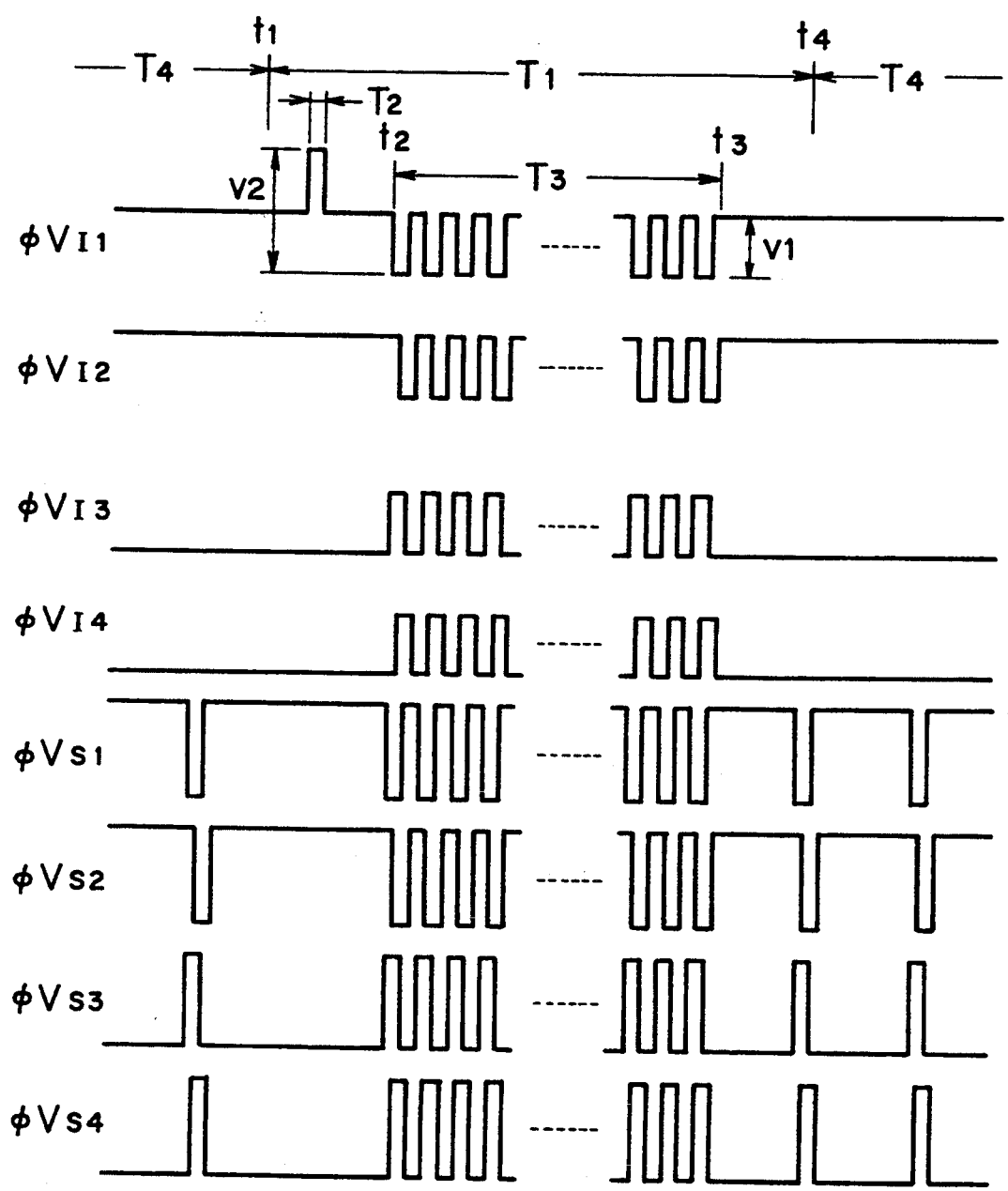
FIG. 3 is a timing chart showing waveforms of driving signals provided by a conventional method for driving CCD imaging device.

FIG. 3 shows a timing chart showing the waveforms of the driving signals for the gate electrodes of the first and second vertical CCDs in the conventional method for driving the two-dimensional imaging device of the type as described above. In FIG. 3, $\phi$VI1, $\phi$VI2, $\phi$VI3 and $\phi$VI4 represent four-phase driving signals applied to the respective gate electrodes of the image section 5, while $\phi$VS1, $\phi$VS2, $\phi$VS3 and $\phi$VS4 represent four-phase driving signals applied to the respective gate electrodes of the storage section 7. The driving signal $\phi$VI1 is applied to the gate electrode 4b of FIG. 2 and other driving signals $\phi$VI2, $\phi$VI3 and $\phi$VI4 are applied to the respective second gate electrodes. The period T1 between the time instants t1 and t4 represents a vertical blanking period and the interval T4 between two vertical blanking periods is an effective picture interval.

In operation, signal charges generated by the radiation sensor 2 during an effective picture interval T4 are read out during a subsequent read-out period T2 of a vertical blanking period T1 through the transfer gate 3 to the first vertical CCD 4 by applying a first driving voltage or read-out driving voltage v2 to the first gate electrode. The first vertical CCD 4 in turn transfers the signal charges within the channel 4a to the successive first vertical CCD 4 constituting the vertical CCD shift register 40 during a frame shift transfer period T3 of the same vertical blanking period T1. The signal charges are transferred from the vertical CCD shift register 40 to the second vertical CCD or CCD memory of the storage section 7 during the same frame shift transfer period T3 and are stored therein for a while.

The signal charges corresponding to a single horizontal scanning line stored in the CCD memories are then repeatedly transferred to the horizontal CCD shift register 8. The horizontal CCD shift register 8 transfers the signal charges corresponding to a single horizontal scanning line at a time and repeat to transfer the signal charges during an effective picture interval. The output section 9 receives the signal charges transferred through the horizontal shift register 8 and outputs a two-dimensional image signal.

The transfer gate 3 of each pixels is driven by a gate electrode 4b which also drives the first vertical CCD 4. Since the transfer gate 3 should read out the signal charges of the radiation sensor 2 only during a read-out period T2 of the vertical blanking period T1, subsequent transfer driving signals for transferring the signal charges through the first vertical CCDs 4 should not open the transfer gate 3 to read out unnecessary and noise-forming charges. From this reason, it is determined in the prior art that the transfer driving signals for driving the vertical CCD shift registers 40 during the frame shift transfer period T3 have a peak value v1 which is equal to a second driving voltage applied to the gate electrode for accumulating signal charges during the effective picture interval T4. The voltage v1 is much lower than the read-out driving voltage v2 for opening the transfer gate 3.

In this situation of the low voltage transfer driving signals, however, the vertical CCD shift register 40 cannot transfer the signal charges in a large amount and with a good efficiency.

Figure 4:
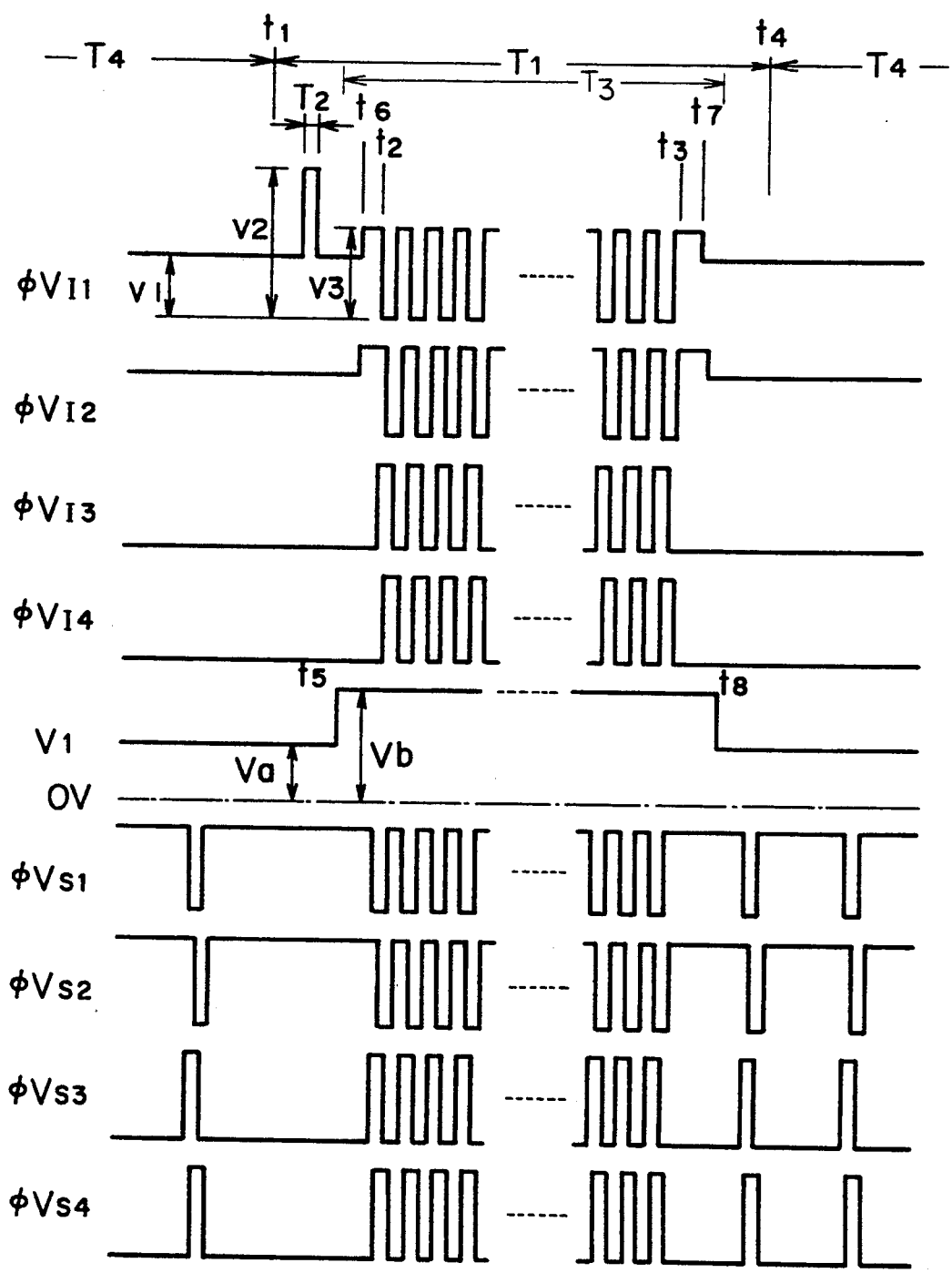
FIG. 4 is a timing chart showing waveforms of driving signals provided by a method according to an embodiment of the present invention.

FIG. 4 shows another timing chart for showing improved driving waveforms adopted in a method according to an embodiment of the present invention, the driving waveforms including the waveforms of the driving signals as well as the bias voltage V1 applied to the junction between the P-type diffusion region 13 and the N-type semiconductor substrate 12. In FIG. 4, the transfer driving signals of the driving signals $\phi$VI1, $\phi$VI2, $\phi$VI3 and $\phi$VI4 have a peak value v3 higher than the second driving voltage v1 applied to the gate electrodes during the effective picture interval T4, and the bias voltage V1 has a first level Va for draining only excess electric charges and a second level Vb higher than the first level Va for draining all of the electric charges. The second level or sweeping level Vb of the bias voltage V1 diverts the electric charges generated in the radiation sensor 2 away from the transfer gate 3 during the frame shift transfer period T3, and enables the electric charges to flow through the protruding portion 15 to the semiconductor substrate 12, as described in detail hereinafter.

Turning back to FIG. 2, there are shown one-dot-chain lines a–c and a–b in the drawing, line a–c being perpendicular to the surface of the substrate 12 and line a–b being parallel to the surface of the substrate 12.

Figure 5:
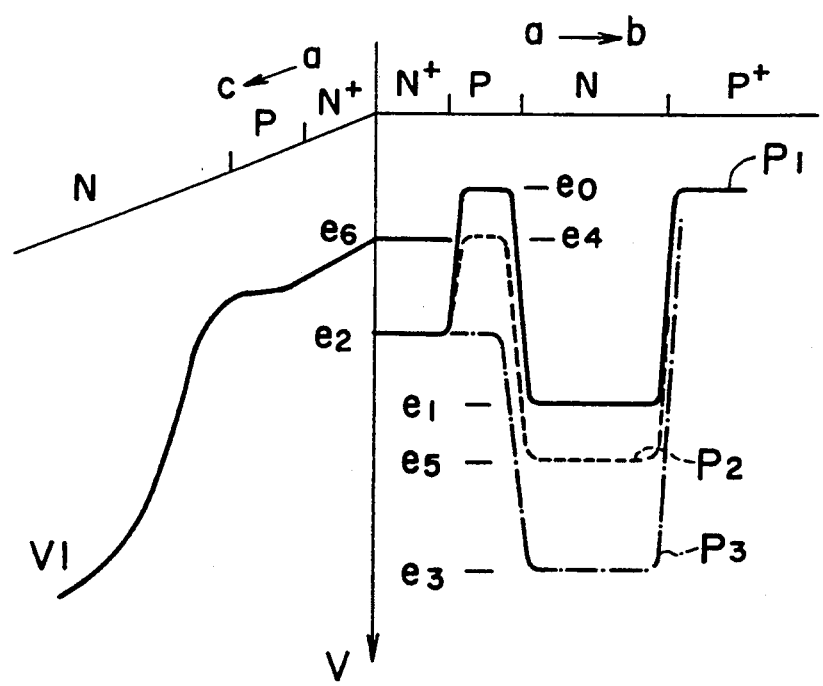
FIG. 5 is diagram showing a potential profile in FIG. 2 provided by the driving signals of FIG. 3.

FIG. 5 shows a potential profile along the lines a–b and a–c of FIG. 2 provided by the conventional method. When the read-out driving voltage v2 of the driving signal $\phi$VI1 is first applied to the gate electrode 4b at the time when signal charges are stored in the radiation sensor 2, the potential at the transfer gate 3 (shown as "P" in a line a–b section in FIG. 5) rises from the potential level $e_0$ of the solid line P1, i.e., the potential profile when 0v of the driving signal $\phi$VI1 is applied to the gate electrode 4b, to the potential level $e_2$ of the one-dot-chain line P3 as shown in FIG. 5. At the same time, the potential at N-type diffusion region 4a of the first vertical CCD 4 rises from the potential level $e_1$ to the potential level $e_3$. As a result, the signal charges (negative charges) stored at the potential $e_6$ in the N+ diffusion region 2 of the radiation sensor are read out through the transfer gate 3 to the vertical CCD 4 of the image section 5, hence the potential at the N+ diffusion region rises from $e_6$ to $e_2$. After the signal charges are read out, the potential at the radiation sensor (N+) 2 again falls from $e_2$ to $e_6$ as the signal charges are accumulated through photoelectric conversion of incident light by the radiation sensor 2.

When the potential at the radiation sensor 2 reaches at $e_6$, the junction between the N+ diffusion region of the radiation sensor 2 and the P-type diffusion region 13 allows excess charges to be drained off following the potential profile along the line a–c in FIG. 5, so that the excess charges generated after the N+ diffusion region reaches at $e_6$ are drained off to the N-type semiconductor substrate 12 through the drain inlet 15. Hence, the radiation sensor 2 stays at the potential level $e_6$.

The signal charges read out to the vertical CCD shift register 40 during the read-out period T2 are transferred from the image section 5 to the storage section 7 by the transfer driving signals during the subsequent frame shift transfer period T3. The transfer driving signals raises and lowers the potential level at the transfer gate 3 and the N-type diffusion region 4a of the vertical CCD 4 between the potential profiles represented by the solid line P1 and the dotted line P2 in FIG. 5. The potential level $e_4$ at the dotted line P2 should not excess the potential level $e_6$ at the N+diffusion region. Because, if the potential level $e_4$ at the transfer gate 3 exceeds the potential level $e_6$, the charges generated and accumulated after the read-out period T2 are transferred to the first vertical CCD 4 to form a noise in the output image signal. Hence, the peak value of the transfer driving signals is set to a voltage v1 much lower than the read-out driving voltage v2 in FIG. 3.

When the method according to the embodiment is applied to the CCD imaging device, the bias voltage V1 applied to the junction between the P-type diffusion region 13 and the N-type semiconductor substrate 12 is set at a first bias level Va during a period other than the frame shift transfer period and set at a second bias level or sweeping level Vb during the frame shift transfer period T3.

Figure 6:
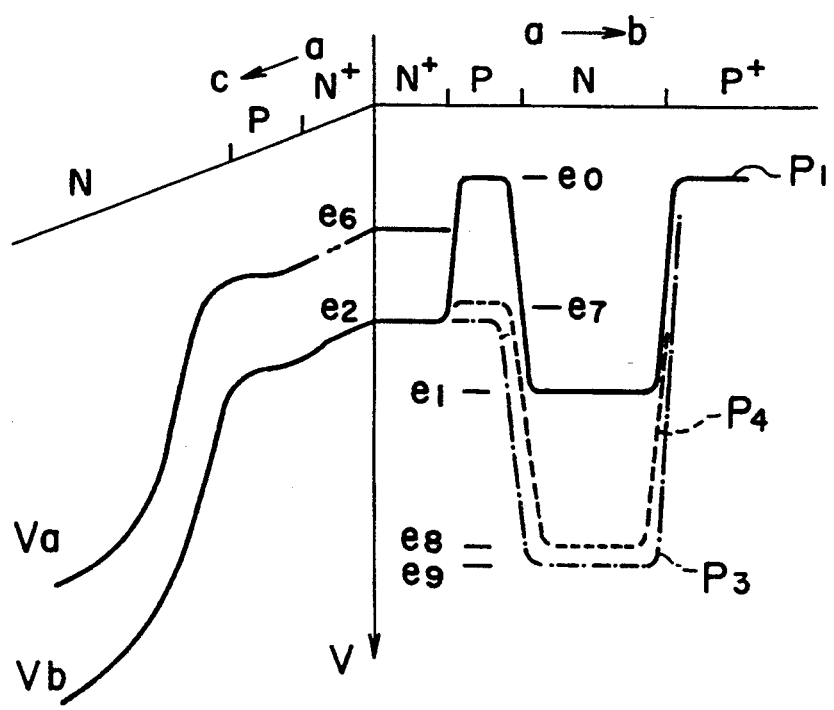
FIG. 6 is a diagram showing another potential profile in FIG. 2 provided by the driving signals of FIG. 4.

FIG. 6, which illustrates similarly to FIG. 5 the potential profile along the lines a–b and a–c in FIG. 2 provided by the method of the present invention, shows a first potential profile along the line a–c provided at the time when the first level Va of the bias voltage V1 is applied, the profile being designated by Va, while a second potential profile provided at the time when the second bias level Vb is applied to the substrate is shown as designated by Vb. When the second potential profile Vb along the line a–c is maintained, all of the electric charges generated in the radiation sensor 2 can be drained off to the N-type semiconductor substrate 12, so that noise-forming electric charges are not transferred to the vertical CCD shift register through the transfer gate 3, even with the transfer driving signals having a peak v3.

The transfer driving signals raises the vertical channel of the vertical CCD shift register constituted by the N-type diffusion region 4a at a higher potential level $e_8$ and the transfer gate 3 at a potential level $e_7$ slightly below the potential level $e_2$. Hence, the signal charges are transferred in a larger amount and with a better efficiency by the CCD shift registers due to the higher amplitude of the transfer driving signals, without transferring the noise-forming charges.

As described above, with the CCD imaging device driven by the method according to the embodiment of the present invention, the frame shift transfer and the effective photoelectric conversion can be separated without affecting the operation of each other. Hence, the vertical CCD shift registers can be driven by the transfer driving signal having a larger amplitude than that in the conventional method, without reading out noise-forming charges from the radiation sensor. As a result, a larger amount of signal charges can be transferred by the vertical CCD shift registers with an improved efficiency than the conventional method.

Although the method according to the embodiment of the present invention is described as being applied to a frame integration driving method, the present invention can be applied to a field integration driving method as well. The waveforms of the driving signals in a field integration driving method will be apparent to those skilled in the art. Hence, a detailed description thereof is not made here.

Since above embodiments are described only for examples, the present invention is not limited to such embodiments and it will be obvious for those skilled in the art that various modifications or alterations can be easily made based on the above embodiments under the scope of the present invention.

What is claimed is:

1. A method for driving a two-dimensional CCD solid state imaging device comprising: a substrate; an image section including a plurality of light-receiving pixels arranged in a vertical and a horizontal directions on said substrate, said light-receiving pixels each having a radiation sensor responsive to incident light for generating electric charges, a transfer gate having a first gate electrode for reading out the electric charges from said radiation sensor, a drain member for discharging the electric charges from said radiation sensor, and a first vertical CCD having second gate electrodes and a vertical channel driven by said first and second gate electrodes for transferring the electric charges read out by said transfer gate, said first vertical CCD of each of said light-receiving pixels arranged in each column of the vertical direction being coupled together to form a vertical CCD shift register; a storage section including second vertical CCDs each for storing for a while and transferring the signal charges transferred by each of said CCD shift registers; a horizontal CCD shift register for transferring the electric charges transferred by said second vertical CCDs; and an output section responsive to the electric charges transferred by said horizontal CCD shift register for outputting a two-dimensional image signal, said method comprising steps of:

applying a first bias voltage to said drain member of each of said light-receiving pixels relative to said radiation sensor of said each of said light-receiving pixels during an effective picture interval;

applying a second bias voltage higher than the first bias voltage to said drain member of each of said light-receiving pixels relative to said radiation sensor of said each of said light-receiving pixels during a frame shift transfer period;

applying a first driving voltage to said first gate electrode of each of said light-receiving pixels for reading out the electric charges from said radiation sensor of said each of said light-receiving pixels during a charge read-out period;

applying a second driving voltage lower than the first driving voltage to said first gate electrode of each of said light-receiving pixels thereby enabling said radiation sensor of said each of said light-receiving pixels to accumulate a certain amount of electric charges during the effective picture interval; and applying transfer driving signals to said first and second gate electrodes for shifting the electric charges within said vertical channel of each said first vertical CCD during the frame shift transfer period, said transfer driving signals each having a peak voltage higher than the second driving voltage.

2. The method for driving a two-dimensional CCD solid state imaging device as defined in claim 1, wherein each said drain member comprises a portion of said substrate.

3. The method for driving a two-dimensional CCD solid state imaging device as defined in claim 2, wherein said substrate has a protruding portion acting as said drain member.

* * * * *